(12) United States Patent
Lanier et al.

(10) Patent No.: US 6,714,713 B2
(45) Date of Patent: Mar. 30, 2004

(54) OPTICAL FIBER HAVING A LOW-SHRINK BUFFER LAYER AND METHODS OF MANUFACTURING THE SAME

(75) Inventors: Jennifer K. Lanier, Granite Falls, NC (US); Naren I. Patel, Hickory, NC (US); Donald K. Hall, Mooresville, NC (US); James A. Register, III, Hickory, NC (US); Daniel J. Rutterman, Connelly Springs, NC (US)

(73) Assignee: Corning Cable Systems LLC, Hickory, NC (US)

( * ) Notice: Subject to any disclaimer, the term of this patent is extended or adjusted under 35 U.S.C. 154(b) by 18 days.

(21) Appl. No.: 10/098,971

(22) Filed: Mar. 15, 2002

(65) Prior Publication Data

US 2003/0174989 A1 Sep. 18, 2003

(51) Int. Cl.[7] .................................................. G02B 6/22
(52) U.S. Cl. ....................................... 385/128; 385/127
(58) Field of Search ................................ 385/123, 124, 385/126, 127, 128

(56) References Cited

U.S. PATENT DOCUMENTS

| | | | | |
|---|---|---|---|---|
| 4,078,853 A | | 3/1978 | Kempf et al. ............. 350/96.23 |
| 4,515,435 A | | 5/1985 | Anderson ................. 350/96.23 |
| 4,642,265 A | * | 2/1987 | Suzuki ......................... 428/375 |
| 4,744,631 A | | 5/1988 | Eichenbaum et al. .... 350/96.23 |
| 4,768,860 A | * | 9/1988 | Tatsukami et al. ........... 385/143 |
| 4,844,578 A | | 7/1989 | Pierini et al. ............. 350/96.34 |
| 4,859,023 A | | 8/1989 | Eichenbaum et al. .... 350/96.23 |
| 5,002,359 A | | 3/1991 | Sayegh ..................... 350/96.23 |
| 5,024,506 A | | 6/1991 | Hardin et al. ............ 350/96.23 |
| 5,181,268 A | | 1/1993 | Chien ......................... 385/128 |
| 5,253,317 A | | 10/1993 | Allen et al. ................. 385/109 |
| 5,253,318 A | | 10/1993 | Sayegh et al. .............. 385/114 |
| 5,352,712 A | * | 10/1994 | Shustack ....................... 522/31 |
| 5,373,578 A | * | 12/1994 | Parker et al. ................ 385/128 |
| 5,427,862 A | * | 6/1995 | Ngo et al. ................... 428/435 |
| 5,574,816 A | | 11/1996 | Yang et al. ................. 385/109 |

(List continued on next page.)

FOREIGN PATENT DOCUMENTS

| | | | | |
|---|---|---|---|---|
| GB | 2215084 A | | 9/1989 | ............ G02B/6/44 |
| JP | 05313050 A | * | 11/1993 | ............ G02B/6/44 |
| JP | 10051062 A | | 2/1998 | ............ G02B/6/44 |
| JP | 10115737 A | | 5/1998 | ............ G02B/6/44 |

OTHER PUBLICATIONS

"Art", admitted prior art.
BASF "Elastollan 1154 D 10 FHF", Feb. 2001.
BASF, "BASF Polyurethane", www.basf.cordata.be/en/tpu.asp, Copyright 2001.
Siecor, "Polyester Elastomer 900 um Buffered Fiber", Jul. 1996.
Gary Corp., Technical Data "GW 2052 Special", Feb. 10, 1987.
Colin G. Richardson, "The Development of A New Low Shrink Jacketing Material For Optical Fiber Cables", 1986, IWCS pp. 40–42.
AlphaGary, Corp., "SGO–302 NAT", Mar. 29, 2001.
AlphaGary Corp., Technical Data "GFO 9940 DW Natural", Dec. 23, 1997.
VISTA, "PLENEX 2400F", admitted prior art.
Advanced Polymer Alloys, Tech Notes "Alcryn ALR–FRC2 Flame–Retarding Concentrate", admitted prior art.

*Primary Examiner*—John D. Lee
*Assistant Examiner*—Scott A Knauss
(74) *Attorney, Agent, or Firm*—Michael E. Carroll, Jr.

(57) ABSTRACT

At least one buffered optical fiber, and methods for manufacturing the same, including an optical fiber and a buffer layer. The buffer layer generally surrounds the optical fiber and has a low-shrink characteristic that preserves optical performance during, for example, temperature variations. In other embodiments, the at least one buffered optical fiber may be a fiber optic ribbon.

44 Claims, 8 Drawing Sheets

U.S. PATENT DOCUMENTS

| | | | |
|---|---|---|---|
| 5,621,838 A | 4/1997 | Nomura et al. | 385/100 |
| 5,838,862 A | 11/1998 | Chien | 385/102 |
| 5,878,180 A | 3/1999 | Nothofer et al. | 385/114 |
| 5,898,811 A | 4/1999 | DiGiovanni et al. | 385/126 |
| 5,913,004 A * | 6/1999 | Takase et al. | 385/123 |
| 5,917,978 A | 6/1999 | Rutterman | 385/109 |
| 5,966,489 A | 10/1999 | Harwell et al. | 385/114 |
| 6,014,488 A * | 1/2000 | Shustack | 385/128 |
| 6,110,593 A * | 8/2000 | Szum et al. | 428/383 |
| 6,167,178 A | 12/2000 | Nave | 385/103 |
| 6,208,790 B1 | 3/2001 | Zopf et al. | 385/128 |
| 6,215,931 B1 | 4/2001 | Risch et al. | 385/109 |
| 6,215,932 B1 | 4/2001 | Hardwick, III et al. | 385/114 |
| 6,222,969 B1 * | 4/2001 | Botelho et al. | 385/114 |
| 6,295,401 B1 | 9/2001 | Rutterman et al. | 385/114 |
| 6,298,189 B1 * | 10/2001 | Szum et al. | 385/128 |
| 6,321,013 B1 | 11/2001 | Hardwick, III et al. | 385/114 |
| 6,324,324 B1 | 11/2001 | Dixon et al. | 385/100 |

* cited by examiner

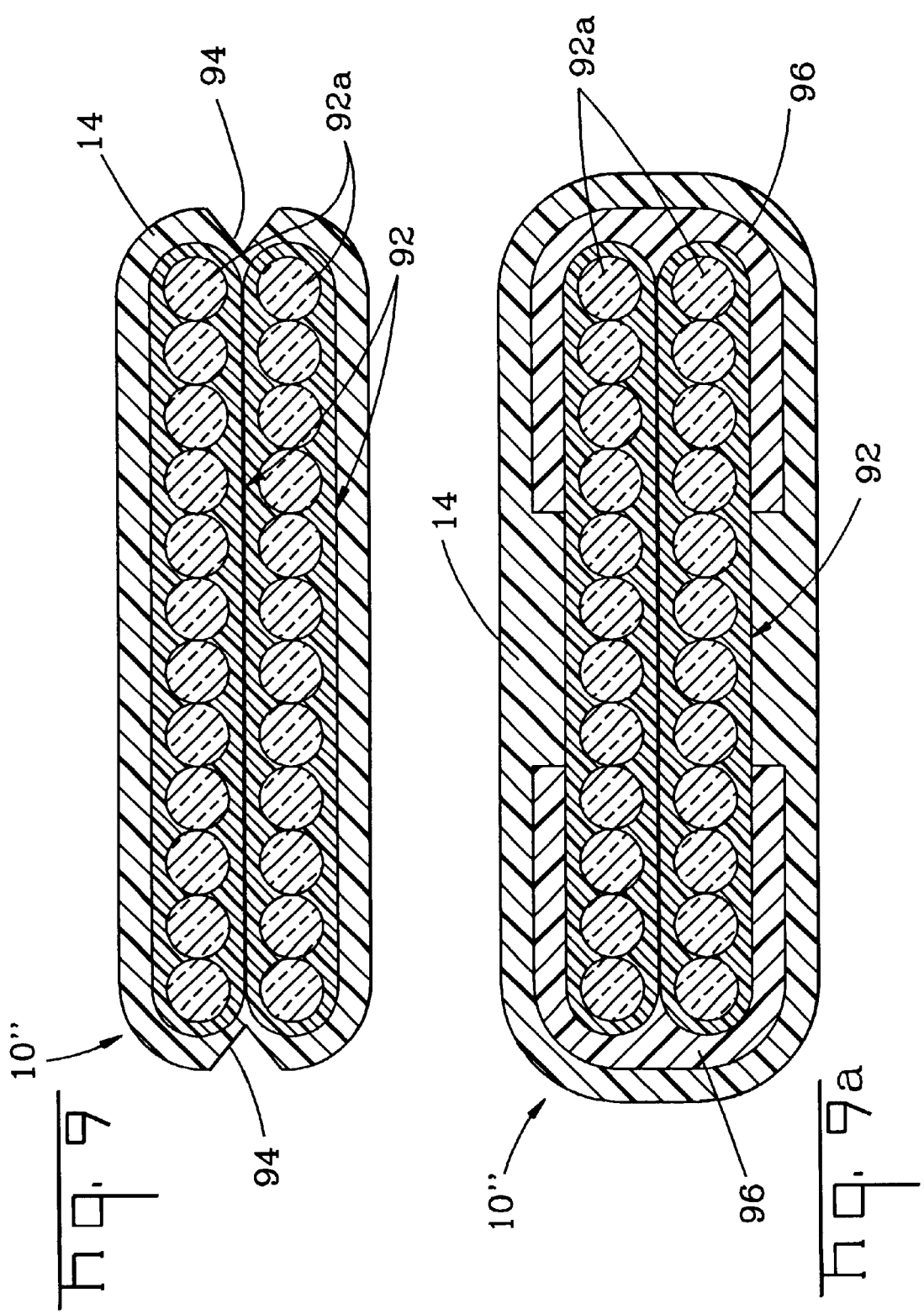

OPTICAL FIBER HAVING A LOW-SHRINK BUFFER LAYER AND METHODS OF MANUFACTURING THE SAME

FIELD OF THE INVENTIONS

The present inventions relate to optical fibers and, more particularly, to optical fibers having at least one buffer layer.

BACKGROUND OF THE INVENTIONS

Optical fibers are used to transmit information signals, for example, voice, video, and/or data information. Optical fibers are relatively fragile silica-based filament-like strands and require protection to preserve the optical performance thereof. For example, optical fibers require protection from macro-bending and/or micro-bending to inhibit undesired optical performance degradation.

In order to meet these requirements, optical fibers may include a protective layer therearound. For example, an optical fiber can have a buffer layer therearound to protect the optical fiber during bending. The buffer layer may be either loosely or tightly disposed around the optical fiber. A loose buffered optical fiber generally has a relatively small gap between the optical fiber and the buffer layer, for example, a gap of about one hundred microns, whereas a tight buffered optical fiber has a relatively smaller or no gap therebetween. An example of a loose buffered fiber is disclosed in U.S. Pat. No. 5,917,978, which is incorporated herein by reference. Additionally, an interfacial layer may completely circumscribe the optical fiber preventing contact between the buffer layer and optical fiber coating, for example, to promote the stripability of the buffer layer from the optical fiber.

Buffered optical fibers can be used, for example, as a buffered optical fiber interconnect assembly that includes a buffered optical fiber and at least one optical connector attached thereto. The buffered optical fiber interconnect assembly can, for example, be used to connect photonic devices. The optical performance of a buffered optical fiber interconnect assembly can be measured, for example, by measuring an insertion loss therein. Insertion loss is a measure of a fraction of the signal light that is lost in the interconnect assembly and is, generally, measured in decibels (dB). In general, insertion loss results in a weaker optical signal and is therefore undesirable. Additionally, in certain connector applications, light can be lost if the end faces of the fibers are separated; therefore, the end faces of the fibers should also be maintained in contact within specifications. Fiber-to-fiber separation also implies an insertion loss due to Fresnel reflections at one of the two glass end interfaces.

The formation of the buffer layer is conventionally accomplished through an extrusion process where the buffering material is melted at a relatively high temperature and extruded over the optical fiber that passes through, for example, a cross-head die. After the buffering material is extruded over the optical fiber, the buffered optical fiber passes through a cooling water trough. When the buffering material such as a polyvinyl chloride (PVC) cools, shrinkage of the buffering material can occur. Shrinkage of the buffer layer can result in undesirable compressive axial stress that can cause undesirably high strains in the optical fiber, which in turn can cause undesirable optical performance degradation.

Additionally, there are other sources of buffer layer shrinkage that may cause degradation in optical performance. For example, in the field, a buffered optical fiber interconnect assembly can also experience relatively large environmental temperature and/or humidity variations. Such variations can result in, for example, buffer layer expansion and contraction. The expansion and contraction of the buffer layer can cause tensile and compressive forces to be transferred to the optical fiber(s) within the interconnect assembly, thereby resulting in undesired optical degradation in the interconnect assembly.

SUMMARY OF THE INVENTIONS

The present invention is directed towards a buffered optical fiber having a core, a cladding and at least one coating, and a buffer layer generally surrounding the optical fiber, wherein the buffer layer has a portion thereof generally contacting a portion of the at least one coating, the buffer layer having an average shrinkage of about 3 mm or less from a first end of the buffered optical fiber.

The present invention is also directed to a buffered optical fiber including a buffer layer generally surrounding the optical fiber, and the buffered optical fiber being a portion of an interconnect assembly, wherein the interconnect assembly has an average maximum delta insertion loss of about 0.04 dB or less at a reference wavelength of about 1625 nm during a thermal cycling test that cycles the temperature between a minimum of −40° C. and a maximum of 85° C.

The present invention is further directed to a method of manufacturing a buffered optical fiber including paying off at least one optical fiber, and extruding a buffer layer around the at least one optical fiber, the buffered optical fiber has a portion thereof generally contacting a portion of the at least one coating of the at least one optical fiber, wherein the buffer layer has an average shrinkage of about 3 mm or less from a first end of the buffered optical fiber.

The present invention is still further directed to a buffered optical fiber including at least one optical fiber, and a buffer layer generally surrounding the optical fiber, wherein the buffer layer has an average shrinkage of about 0.5 mm or less from a first end of the buffered optical fiber.

The present invention is also directed to a buffered optical fiber including at least one optical fiber, and a buffer layer generally surrounding the optical fiber, wherein the buffer layer has an average strip force of about 5 Newtons or less when a 50 cm length of the buffer layer is stripped from an end of the buffered optical fiber.

BRIEF DESCRIPTION OF THE FIGURES

FIG. 3 is an exemplary bar graph, comparing the average maximum delta insertion loss of the buffered optical fiber interconnect cable assembly of FIG. 3a using exemplary buffer materials according to the present inventions, with a buffered optical fiber interconnect cable assembly according to FIG. 3a having conventional buffer materials at various optical source wavelengths.

FIG. 3a is a schematic view of a portion of an exemplary buffered optical fiber interconnect assembly according to the present inventions.

FIG. 5a is an enlarged view of a section of the extrusion tool of FIG. 5.

FIG. 5b is an enlarged view of the exit face of the extrusion tooling taken at line b—b of FIG. 6.

FIG. 9 is a cross-sectional view of an exemplary buffered fiber optic ribbon according to the present inventions.

FIG. 9a is a cross-sectional view of an exemplary buffered fiber optic ribbon according to another embodiment of the present inventions.

DETAILED DESCRIPTION OF THE INVENTIONS

Figure 1:
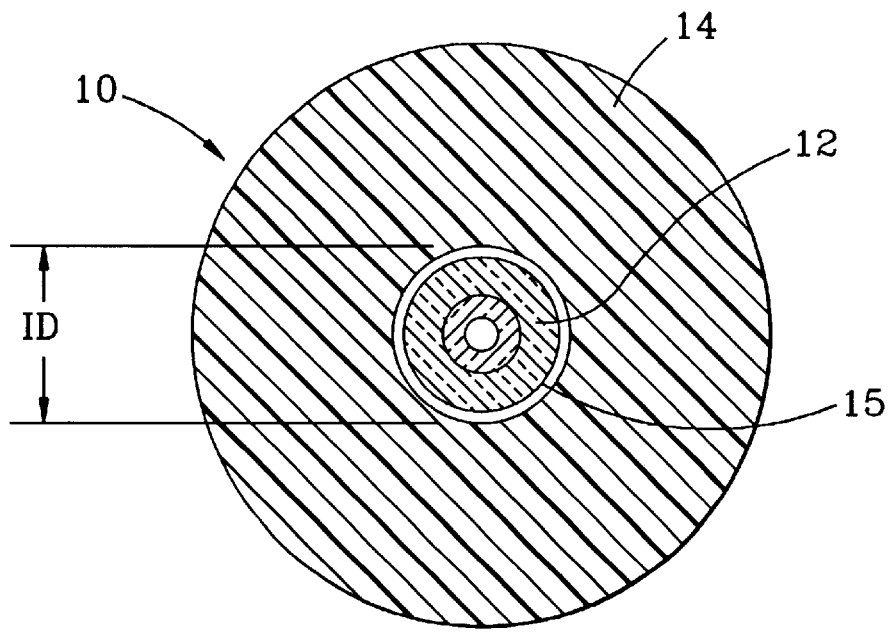
FIG. 1 is a cross-sectional view of an exemplary buffered optical fiber according to the present inventions.

Referring to FIG. 1, the present inventions will be described with reference to an exemplary buffered optical fiber 10. Buffered optical fiber 10 includes at least one optical fiber 12 having at least one buffer layer 14 therearound. Buffer layer 14 according to the present inventions includes a low-shrink characteristic that preserves optical performance, for example, during temperature variations and/or high humidity environments. A portion of buffer layer 14 can be in contact with the coating on optical fiber 10; however, in other embodiments a suitable substance, for example, interfacial layer 15 can be interposed between buffer layer 14 and an outer coating of optical fiber 12. If used, interfacial layer 15 is generally interposed between optical fiber 12 and buffer layer 14 to promote, for example, size control and/or stripability of buffer layer 14. However, stripability of buffered optical fiber 10 of the present inventions can be achieved when interfacial layer 15 is not provided.

Buffer layer 14 can be relatively loosely or tightly disposed around optical fiber 12. For example, optical fiber 12 can have a nominal outer diameter of about 245 microns and buffer layer 14 can have a nominal inner diameter ID of about 255 to about 350 microns, more preferably about 255 to about 320 microns, and most preferably about 255 microns to about 270 microns, with an outer diameter of up to about 900 microns. However, other suitable dimensions may be used that provide suitable shrinkage and stripability performance. Additionally, in other embodiments buffer layer 14 can include more than one layer and/or material disposed around optical fiber 12.

Buffer layer 14 of the present inventions should not be confused with a buffer tube. Buffer tubes typically include one or more optical fibers disposed within the buffer tube that float in a water-blocking grease. Moreover, buffer tubes generally have a relatively large inner diameter when compared to the outer diameter of the optical fibers therein. Furthermore, a water-blocking grease should not be confused with an interfacial layer. Water-blocking grease is used to inhibit the migration of water within the buffer tube, whereas the interfacial layer is used for improving stripability of the buffer layer from the optical fiber.

In one embodiment, optical fiber 12 is a single-mode optical fiber; however, other types of optical fibers and/or configurations may be used. For example, optical fiber 12 can be colored, ribbonized, multi-mode, pure-mode, erbium doped, polarization maintaining fiber, and/or other suitable light waveguides. Each optical fiber 12 can include a silica-based core that is operative to transmit light and is surrounded by a silica-based cladding having a lower index of refraction than the core. Additionally, one or more coatings can be applied to optical fiber 12. For example, a soft primary coating surrounds the cladding, and a relatively rigid secondary coating surrounds the primary coating. The coating can also include an identifying means such as ink or other suitable indicia for identification, but generally excludes an interfacial layer. Suitable optical fibers are available commercially from Corning Incorporated of Corning, N.Y.

Where an interfacial layer 15 is used it can include, for example, a Teflon® containing material. Additionally, other suitable interfacial layers can be used, for example, a UV acrylate and/or PVC. If used, interfacial layer 15 can serve as a release layer that provides a controlled bond between buffer layer 14 and optical fiber 12 so that a craftsman can easily strip buffer layer 14 from optical fiber 12, for example, during a termination procedure. However, depending on the inner diameter ID (FIG. 1) and/or material used for buffer layer 14, embodiments of the present inventions can have a stripability that is the same or better than conventional buffered optical fibers with an interfacial layer. In certain applications, it may be advantageous to strip buffer layer 14 in long lengths, for example, 50 cm or more in one pass. Long strip lengths may be accomplished with or without interfacial layer 15; however, different stripping techniques may be required if interfacial layer 15 is omitted and long strip lengths are required. For example, one technique achieving long strip lengths of buffer layer 14 is to clip and/or score buffer layer 14 at the desired strip point. Next, the portion of buffer layer 14 being removed from the buffered optical fiber 10 is laid flat on a surface and adhered to the surface with a tape. Finally, optical fiber 10 is pulled out of the portion of buffer layer 14 adhered to the surface by the tape.

The present inventors conducted stripability experiments on buffered optical fibers 10 according to the present inventions and compared the results with the stripability performance of conventional buffered optical fibers. The present inventors discovered that as the distance between the nominal outer diameter of optical fiber 12 and the nominal inner diameter ID of buffer layer 14 of exemplary materials of the present inventions generally increased, the force required to strip a given length of buffer layer 14 generally decreased. However, the present inventors also discovered that as the distance between the outer diameter of optical fiber 12 and the inner diameter ID of buffer layer 14 increased, the shrinkage of buffer layer 14 also generally increased during, for example, thermal variations. Increased shrinkage of buffer layer 14 is generally an undesired result because it may generally degrade optical performance, for example, during thermal variations.

More particularly, a 50 cm length of buffer material was stripped from a buffered optical fiber. The buffered optical fiber being stripped was clipped at the predetermined position and the 50 cm length of buffer material being stripped was taped down as described hereinabove. The free end of the buffered optical fiber was passed around a sheave and inserted into an Instron machine. The sheave had a diameter of about 75 mm and a tape was wrapped on the outer surface thereof to reduce the friction force on the buffered optical fiber. The Instron machine was used to measure and record the force required for stripping the 50 cm length of buffer material from the buffered optical fiber. Three runs of each sample were tested and the results were averaged together for the results presented in Table 1. A peak force was measured that included the force required to completely tear the buffer material as well as initiate movement of the buffered optical fiber with respect to the portion of the buffer material that was taped down. Additionally, an average force was measured over the range of about a 1 mm separation to about a 450 mm separation of the portion of buffer material that was removed from the buffered optical fiber.

Specifically, three samples of an exemplary material according to the present inventions, without an interfacial layer, were tested for strip force performance along with two different conventional materials. Samples using the conventional materials included an interfacial layer of Teflon® based material having a thickness of about 5 microns. The conventional materials having an interfacial layer are denoted with an asterisk in Table 1. The three samples of the material according to the present inventions were a thermoplastic elastomer (TPE) sold under the tradename GFO 9940DW, which is available from AlphaGary Corporation of Leominster, Mass. The first conventional material was a PVC sold under the tradename GW2052S and is available from AlphaGary. The second conventional material is a PVC sold under the tradename Plenex® 2400F available from NAP of Madison, Miss., a division of the Georgia Gulf Co. The average buffer ID, results of the strip force test, and average buffer shrinkage are presented in Table 1. The average buffer shrinkage was measured using five samples in a first shrinkage test as discussed herein.

TABLE 1

| Buffer Material | Ave. Buffer ID (microns) | Peak Strip Force (N) | Ave. Strip Force (N) | Ave. Buffer Shrinkage (mm) |
| --- | --- | --- | --- | --- |
| GFO 9940DW | 259 | 10.9 | 4.1 | 0.15 |
| GFO 9940DW | 326 | 12.6 | 0.2 | 1.10 |
| GFO 9940DW | 328 | 2.8 | 0.1 | 2.10 |
| GW2052S* | 265 | 18.9 | 7.2 | 0.96 |
| 2400F* | 265 | 25.7 | 8.2 | 0.71 |
| 2400F* | 267 | 11.9 | 6.1 | 3.08 |

In embodiments of the present inventions buffer layer 14 has a relatively low-shrink characteristic while maintaining good strip performance. For example, the embodiments according to the present inventions having an average buffer ID of 259 microns had an average strip force that was lower than the conventional materials that had a relatively larger average buffer ID and an interfacial layer. The present inventors investigated various methods and/or techniques to influence the shrink characteristic of buffer layer 14. The present inventors have discovered that, for example, material selection, material characteristics, and/or processing parameters can be used to control the shrink characteristics of buffer layer 14 and thereby preserve optical performance. More specifically, the present inventors investigated numerous materials in combination with various processing parameters to determine their influence on the shrink characteristic of buffer layer 14. The present inventors have surprisingly discovered that buffer layers having low-shrink characteristics can substantially preserve, for example, the optical performance of a buffered optical fiber interconnect cable assembly (FIG. 3a). Discussed herein are embodiments of the present inventions that the present inventors believe give the best results; however, other suitable materials in combination with, or without, other processing parameters can be practiced with the concepts of the present inventions to obtain suitable results.

Figure 2:
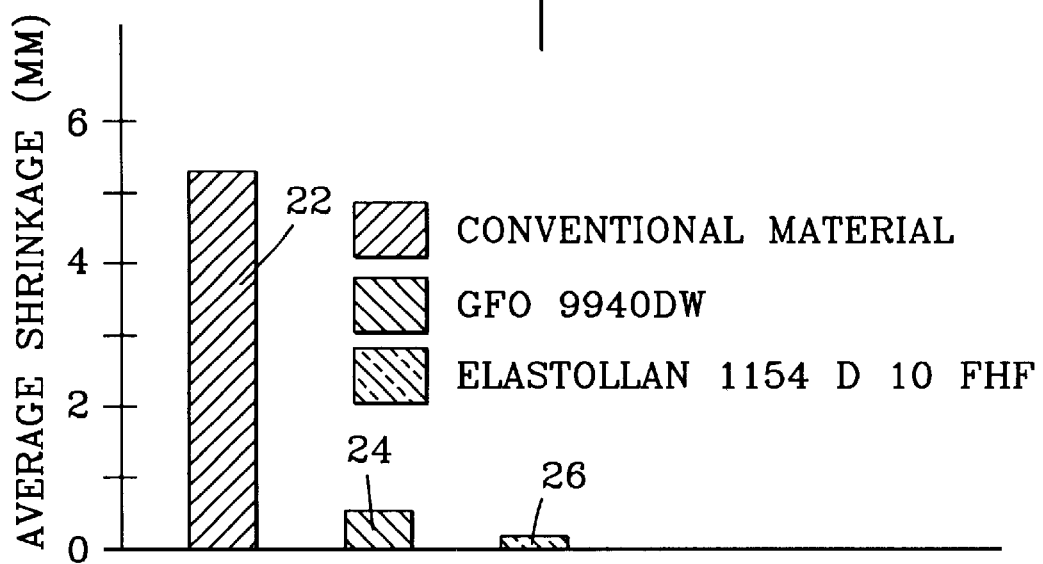
FIG. 2 is an exemplary bar graph, comparing the average shrinkage of a buffered optical fiber of FIG. 1 using exemplary buffer materials according to the present inventions, with an average shrinkage of the buffered optical fiber according to FIG. 1 having conventional buffer materials.
Figure 2:
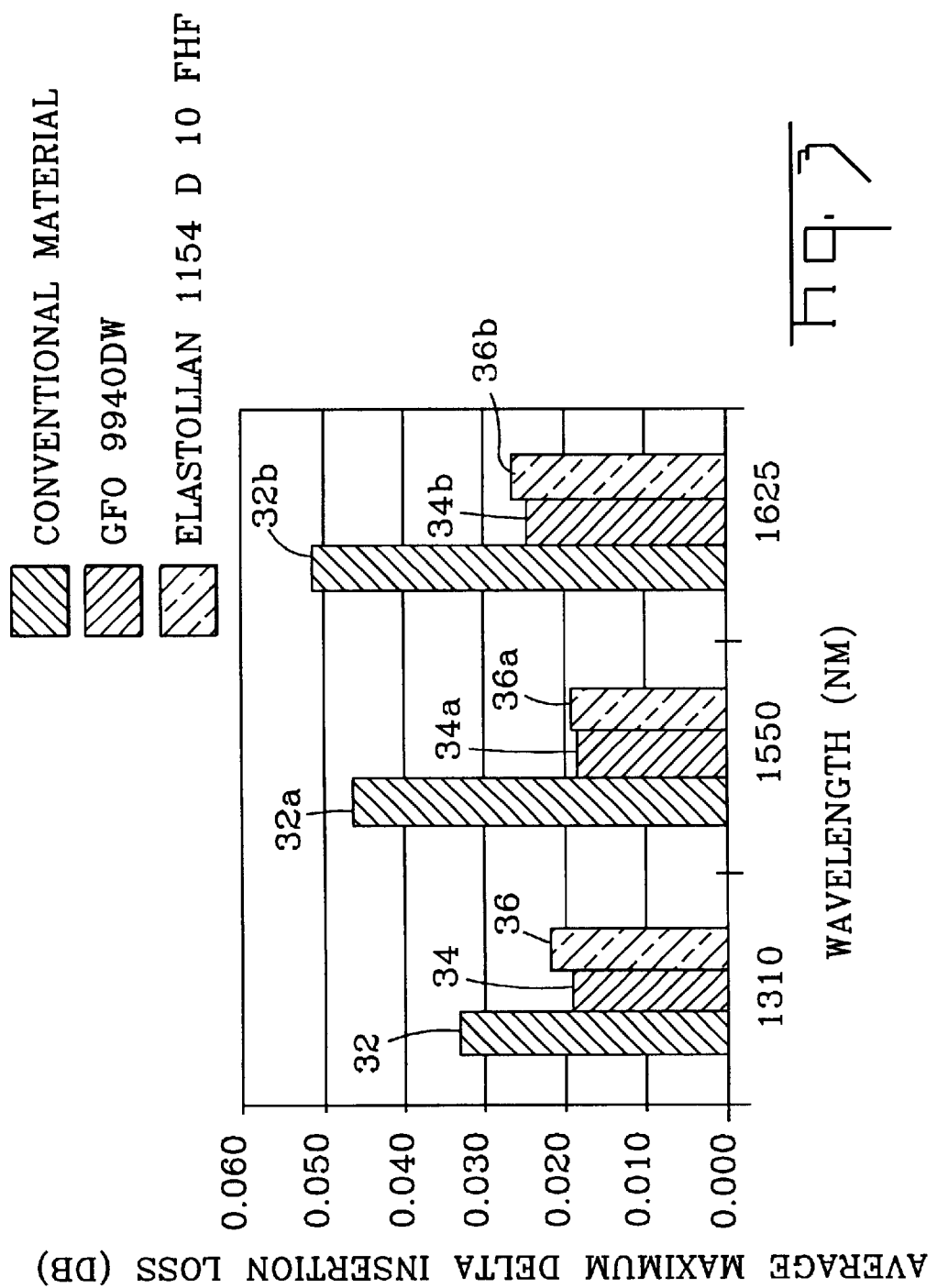

FIG. 2 is a graph depicting comparative average shrinkage data for buffer layer 14 according to embodiments of the present inventions, as compared with a conventional buffer material. More particularly, the embodiments experimented with according to the present inventions included a buffer layer 14 having a nominal outer diameter of about 900 microns, and a nominal inner diameter ID of about 260 microns. An optical fiber 12 having a 245 micron nominal outer diameter without an interfacial layer was used. The conventional buffered optical fiber included a Teflon® based interfacial layer between the optical fiber and the conventional buffer material. However, the concepts of the present inventions can be practiced with or without interfacial layer 15 and/or buffer layers having other suitable dimensions. Moreover, results may vary with the inner diameter ID and/or outer diameter of buffer layer 14.

In addition, process parameters can affect the characteristics of the final product. For example, the embodiments of the present inventions graphically summarized in FIG. 2 were processed with a draw-down vacuum of about 15 inches of mercury (in of Hg), a line speed of about 300 meters per minute and a water trough distance of about 150 mm. However, other suitable processing parameters may be used. For example, embodiments run on different lines and/or different equipment may have different processing parameters and/or different results. Additionally, the effects of processing parameters will be further discussed herein.

The present inventors conducted shrinkage experiments on samples of buffered optical fibers 10 according to the present inventions. In particular, two different shrinkage tests were used to evaluate the performance of buffer layer 14. The first shrinkage test requires a sample of the buffered optical fiber 10 about 1 m long. The sample is placed in a thermal chamber at a temperature of about 150±2° C. for five minutes. At the end of the five minutes, buffered optical fiber 10 is removed from the thermal chamber and laid flat so the length of optical fiber 12 protruding beyond buffer layer 14 at each end can be measured about one hour thereafter. The results of a number of samples are then averaged to obtain an exemplary average shrinkage value for the first test. A second shrinkage test requires a sample of the buffered optical fiber 10 about 2 m long. The sample is placed in a thermal chamber at a temperature of about 85±2° C. and with an 85% relative humidity for about two weeks. At the end of the two weeks, buffered optical fiber 10 is removed from the thermal chamber so the length of optical fiber 12 protruding beyond buffer layer 14 at each end can be measured about one hour thereafter. The results of a number of samples are then averaged to obtain an exemplary average shrinkage value for the second test. However, the average shrinkage may be measured at other suitable time intervals and/or other suitable sample lengths for either shrinkage test.

Bar 22 (FIG. 2) depicts a baseline average shrinkage during the first shrinkage test of a conventional buffer layer, namely, a polyvinyl chloride (PVC) material sold under the tradename Plenex® 2400F. The average shrinkage for ten measurements of the conventional material using the first shrinkage test was about 5.4 mm. This relatively high shrinkage of the conventional buffer layer may cause, for example, stresses and/or strains on the optical fiber and result in degraded optical performance.

Certain materials and/or material properties may possibly influence the shrinkage characteristic of buffer layer 14. Concerning materials, for example, a thermoplastic elastomer (TPE) can reduce average shrinkage compared with the average shrinkage of a conventional buffer material. However, other suitable materials may be used to achieve similar results, for example, thermoplastic polyurethanes (TPUs). Moreover, materials having similar material properties with respect to TPUs and TPEs and/or materials within the same material grade, family, and/or having similar blends may also provide reduced average shrinkage results.

Concerning material properties, an ultimate elongation, a preferred hardness, a melting onset temperature, and/or a cross-linking mechanism are among the material properties that may inhibit shrinkage of buffer layer 14 and/or preserve optical performance. Additionally, other suitable material properties may be influential, for example: Theological properties; a tensile modulus; low crystallinity; and/or amorphous structure. However, the materials according to the present inventions should meet all of the requirements for buffered optical fiber 10.

In an aspect of the present inventions, the material of buffer layer 14 can have a predetermined ultimate elongation, for example, as measured using ASTM D-412. An ultimate elongation in the range of about 300 percent or more, and more preferably in the range of about 325 percent or more and most preferably about 350 percent or more is desired. Other suitable materials using the concepts of the present inventions may have other suitable ranges of ultimate elongation; however, there are generally limits of ultimate elongation that make, for example, buffer layer 14 difficult to strip.

In another aspect of the present inventions, the material of buffer layer 14 has, for example, a Shore D hardness measured using ASTM D-2240 in the range of about 50 to 60. However, there may be limits of hardness, for example, at a lower hardness the material is difficult to strip.

In another aspect, the present inventions can include a melting onset temperature that is generally above the temperature that the fiber optic cable will be exposed to in service. Melting onset temperature is defined as the lowest temperature at which melting becomes discernible. Melting onset temperature is used because most semi-crystalline polymers do not have a well-defined melting point. Melting onset temperature can be measured by a differential scanning calorimetry (DSC) method. For example, suitable materials according to the present inventions may have a melting onset temperature of about 90° C. or greater. However, the materials of the present inventions are extruded at a temperature that is generally greater than the melting onset temperatures. Additionally, cross-linking mechanisms capable of impeding polymer reorientation can also be useful.

Embodiments according to the concepts of the present inventions generally have an average shrinkage of about 3 mm or less to preserve optical performance. Preferably, embodiments of the present inventions have an average shrinkage of about 2 mm or less, more preferably, an average shrinkage of about 1 mm or less, and most preferably, an average shrinkage of about 0.5 mm or less.

FIG. 2 also depicts the average shrinkage results during the first shrinkage test for two exemplary materials of the present inventions. Bar 24 represents GFO 9940DW, a thermoplastic elastomer (TPE). The GFO 9940DW material was determined to have an average first test shrinkage of about 0.2 mm. GFO 9940DW has an ultimate elongation of about 650 percent (ASTM D-412), and a Shore D hardness of about 48 (ASTM D-2240).

Bar 26 represents a thermoplastic polyether-polyurethane (TPU) sold under the tradename Elastollan® 1154 D 10 FHF available from BASF located in Wyandotte, Mich. Elastollan® 1154 D 10 FHF has an average first test shrinkage of essentially about 0.0 mm; however, a non-zero value for bar 26 is shown for illustrative purposes. Elastollan® 1154 D 10 FHF has an ultimate elongation of about 350 percent (ASTM D-412), and a Shore D hardness of about 58 (ASTM D-2240).

As depicted in FIG. 2, the two exemplary materials surprisingly reduced the average shrinkage of buffer layer 14, compared with the conventional material. For example, the GFO 9940DW material has about four percent of the buffer layer shrinkage compared with the conventional buffer material shrinkage. The Elastollan® 1154 D 10 FHF material had no appreciable buffer layer shrinkage compared with the conventional buffer material. The Elastollan® 1154 D 10 FHF material tended to harden on the extrusion screw when not running; however, different processing conditions and/or additives can be helpful in avoiding this problem. Additionally, of the two exemplary materials experimented with, the GFO 9940DW material is suitable for use with general-purpose cables (OFN), while the Elastollan® 1154 D 10 FHF material was not tested for general-purpose cables (OFN), but may be suitable therefor. Moreover, materials of the present inventions may include other suitable additives, for example, for improving flame retardance and/or processing. For example, buffer layer 14 can also be designed to be flame resistant as disclosed by U.S. Pat. No. 6,167,178, the subject matter of which is incorporated herein by reference. For example, buffer layer 14 can include aluminum trihydrate, antimony trioxide, or other suitable additives to improve the flame resistance of buffer layer 14.

The reduced average shrinkage of the exemplary materials according to the present inventions generally inhibit the stress and/or strain that optical fiber 12 experiences during, for example, environmental variations such as relatively high temperatures and/or relatively high humidity. Consequently, the optical performance of optical fiber 12 during environmental variations is improved. The embodiments of the present inventions, as depicted in FIG. 2, were tested by the present inventors for optical performance while varying environmental conditions (FIG. 3).

As shown, FIG. 3 depicts an average maximum delta insertion loss measured in dB for an exemplary buffered optical fiber assembly 39 (FIG. 3a). More specifically, the average maximum delta insertion loss was measured at three optical source wavelengths, 1310 nm, 1550 nm, and 1625 nm, for the exemplary materials of the present inventions, and the conventional material, during a temperature cycling test. The buffered optical fibers using both the exemplary materials, and the conventional materials, included single mode optical fibers.

As used herein, delta insertion loss is, generally speaking, a measurement of optical performance loss of a buffered optical fiber interconnect assembly due to, for example, stresses and/or strains experienced by the assembly during environmental changes from ambient conditions. The delta insertion loss generally excludes insertion losses, inherent attenuation, and other losses, in the optical fibers, fiber optic connectors and/or splices, which are generally measured at ambient conditions. For example, an optical fiber generally has a certain attenuation loss due to characteristics inherent in the optical fiber, for example, reflectivity or imperfections in the fiber. Likewise, a fiber optic connector generally has a certain insertion loss due to, for example, misalignment of cores of the mating optical fibers. To determine delta insertion loss a baseline insertion loss from the optical fiber, fiber optic connectors and/or splices is measured at ambient conditions (i.e., room temperature) and subtracted from an insertion loss at a non-ambient condition. For example, the non-ambient condition may be a change in temperature that causes the buffered optical fiber interconnect assembly to experience a decrease in optical performance. One such method is to cycle the temperature while measuring the optical performance of the buffered optical fiber interconnect assembly.

As used herein, a suitable temperature cycling test is defined by attaching suitable fiber optic connectors at both ends of a buffered optical fiber that is 3.0+0.5 meters long to form a buffered optical fiber interconnect assembly (hereinafter interconnect assembly). The entire length of the interconnect assembly is then placed within a thermal chamber including the fiber optic connectors. The fiber optic connectors of the interconnect assembly are mated, within the thermal chamber, with other suitable interconnect assemblies, generally having similar properties with the interconnect assembly being tested. The other suitable interconnect assemblies are then connected to inputs of a suitable optical measurement testing rig. An optical signal is sent through the interconnect assembly, and a baseline insertion loss of the interconnect assembly is measured at an ambient condition, about 23° C. The temperature within the thermal chamber is then cycled between −40° C. and 85° C. More specifically, a period within the thermal chamber is defined as ramping the temperature from about 23° C. up to about 85° C. and holding this temperature plateau for about one hour, then ramping the temperature down to 23° C. and holding this temperature plateau for one hour. Next, the temperature within the thermal chamber was ramped down to −40° C. and held at this temperature plateau for 1 hour, then the temperature was ramped back to 23° C. and held at this temperature plateau for one hour. The ramp times between temperature plateaus were about one hour and the insertion loss was measured at each temperature plateau at least 30 minutes into each temperature plateau. The temperature cycling test was repeated 21 times to simulate service life stresses. The maximum insertion loss throughout this temperature cycling test was measured for each interconnect assembly. The baseline insertion loss was subtracted from the maximum insertion loss and then divided by two to calculate the maximum delta insertion loss for a fiber optic connector pair. The difference between maximum insertion loss and baseline insertion loss was divided by two because both of the fiber optic connectors of the interconnect assembly were located within the thermal chamber during the temperature cycling test.

This temperature cycling test was done for five samples of each material of the present inventions, and an average maximum delta insertion loss was calculated and is presented in FIG. 3. Bars 32, 32a, and 32b, respectively, illustrate an average maximum delta insertion loss of the interconnect assembly that includes buffered optical fiber 10 having buffer layer 14 formed from the Plenex® 2400F conventional material. The insertion losses were measured at optical source wavelengths as follows: 1310 nm, a loss of about 0.032 dB; at 1550 nm, a loss of about 0.048 dB; and at 1625 nm, a loss of about 0.051 dB.

Bars 34, 34a, and 34b, respectively, illustrate exemplary average maximum delta insertion losses of the interconnect assembly that includes buffered optical fiber 10 having buffer layer 14 formed from one of the exemplary materials according to the present inventions, namely, GFO 9940DW. The insertion losses were as follows: at 1310 nm, a loss of about 0.019 dB; at 1550 nm, a loss of about 0.019 dB; and at 1625 nm, a loss of about 0.024 dB. Bars 36, 36a, and 36b, respectively, illustrate exemplary average maximum delta insertion losses of the interconnect assembly that includes buffered optical fiber 10 having buffer layer 14 formed from another exemplary materials according to the present inventions, namely, Elastollan® 1154 D 10 FHF. The insertion losses were as follows: at 1310 nm, a loss of about 0.022 dB; at 1550 nm, a loss of about 0.019 dB, and at 1625 nm, a loss of about 0.027 dB.

The exemplary materials of the present inventions surprisingly reduced the average maximum delta insertion loss compared with the conventional material during the temperature cycling test. For example, at a wavelength of 1625 nm both the GFO 9940DW and the Elastollan® 1154 D 10 FHF materials have about a fifty percent reduction in average maximum delta insertion loss compared with the Plenex® 2400F conventional buffer material.

As noted above, a number of processing parameters can also influence the shrinkage characteristics of buffer layer 14 according to the present inventions. The most influential processing parameters can be: draw-down vacuum; moisture content of the optical fiber; water trough distance; manufacturing line-speed; and/or draw-down ratio (DDR). Additionally, extruder temperature profile may influence shrink characteristics.

Figure 4:
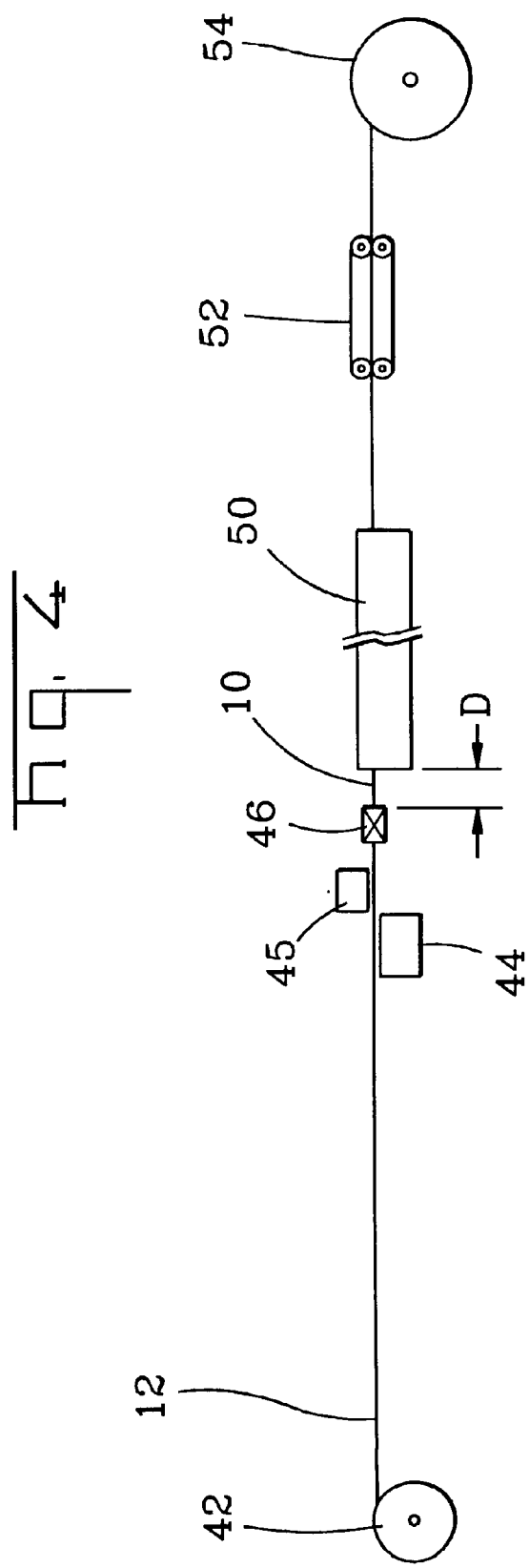
FIG. 4 is a schematic view of an exemplary manufacturing line for use in the manufacture of embodiments of the present inventions.

An exemplary line for manufacturing buffered optical fiber 10 according to the present inventions is schematically depicted in FIG. 4. Optical fiber 12 is paid-off from pay-off reel 42 under a suitable tension. An optical fiber pre-heater 44 can be used to advantageously reduce the moisture content of optical fiber 12 as will be discussed herein. However, the reduction of the moisture content of optical fiber 12 may be accomplished off-line or optical fiber 12 may have suitable moisture levels without drying the same. Additionally, if an interfacial layer 15 is used it may be applied to optical fiber 12 by coater 45, which may be accomplished on-line as shown or off-line. However, the line for manufacturing embodiments according to the present inventions can exclude either pre-heater 44, coater 45, or both. Buffer layer 14 is then applied by cross-head extruder 46 to generally surround optical fiber 12 to complete buffered optical fiber 10. Water trough 50 cools the relatively hot buffer layer 14 after extrusion. A water trough distance D is defined as the distance between the exit of the cross-head extruder 46 and the entrance of water trough 50. After exiting water trough 50, buffered optical fiber 10 then passes through a pulling device 52 and is wound onto take-up reel 54. Buffered optical fibers 10 can be cooled in a trough 50 having dual temperature zones, for example, a first temperature zone at about 40° C. and a second temperature zone at about 15° C.; however, other suitable water temperatures and/or zones of water temperatures may be used in trough 50.

Figure 5:
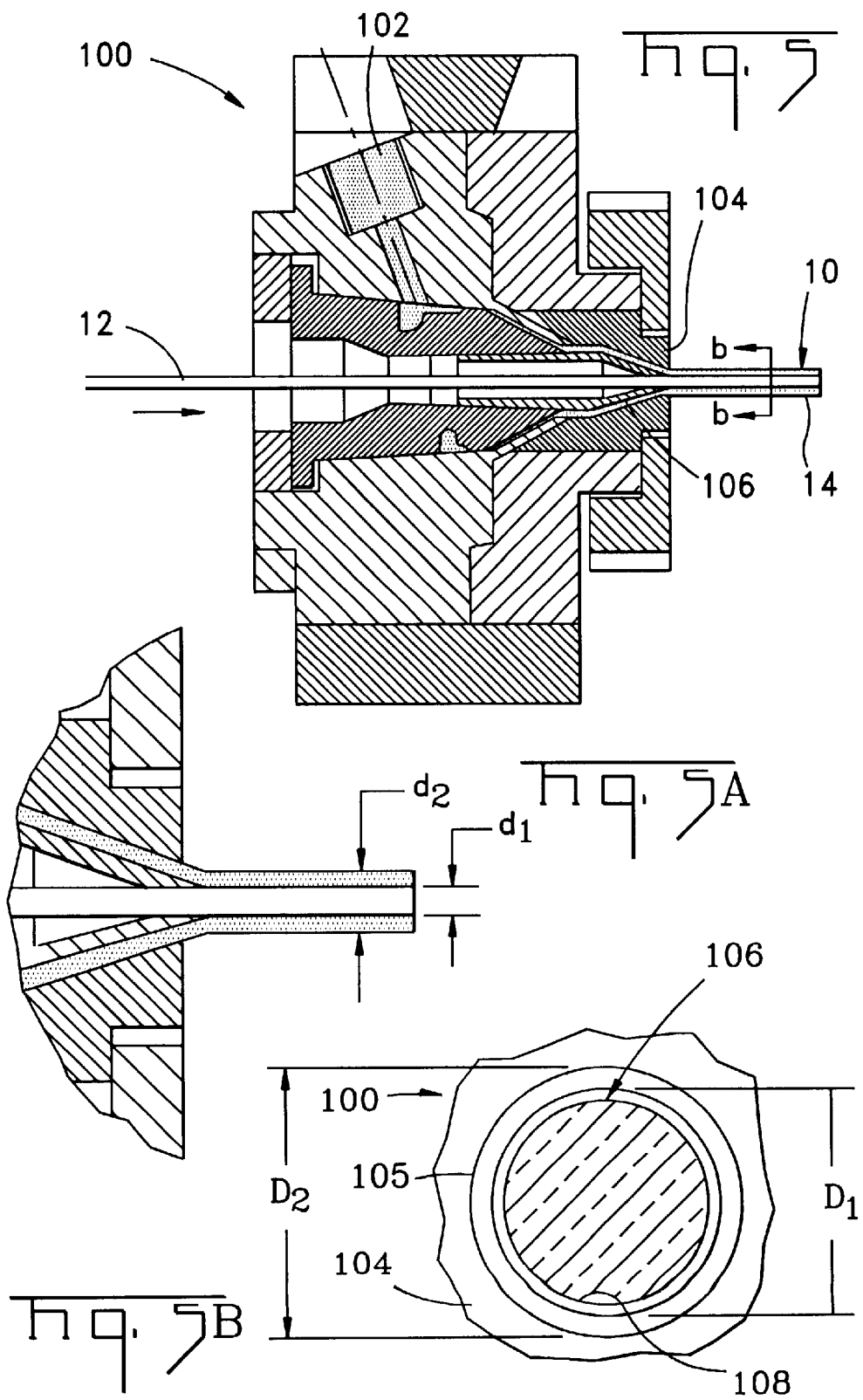
FIG. 5 is a schematic, cross-sectional, representation of an exemplary extrusion tool for manufacturing buffered optical fibers according to the present inventions.

FIGS. 5–5b depict a schematic representation of exemplary extrusion tooling 100 suitable for use with cross-head extruder 46. By way of example, extrusion tooling 100 is operative to extrude buffer materials of the present inventions around optical fiber 12. As optical fiber 12 is fed into extrusion tooling 100 (FIG. 5), a buffering material according to the present inventions is supplied under suitable temperature and pressure conditions to an inlet port 102. The buffering material is channeled toward a die 104 and a tip 106. The buffering material generally surrounds optical fiber 12 thereby forming buffer layer 14 therearound to complete buffered optical fiber 10.

FIG. 5b schematically illustrates an exit face of extrusion tooling 100 with the buffering material or melt removed for illustrative purposes. In one embodiment of the present inventions, tip 106 includes an orifice 108 defined within the end portion of tip 106 for receiving optical fiber 12. More particularly, tip 106 can include a round shape that generally complements optical fiber 12; however, other suitable shapes can be employed. Tip 106 includes an inner diameter generally greater than the respective diameter of optical fiber 12 and an outer diameter $D_1$. Die 104 includes a die orifice 105 having a diameter $D_2$. Diameters $D_1$ and $D_2$ are generally greater than the respective finished inner and outer diameters $d_1$ and $d_2$ (FIG. 5a) of buffer layer 14. This draw-down vacuum extrusion results in buffer layer 14 having a generally round cross-section, as exemplified by the embodiment of FIG. 1. In the draw-down vacuum process, the end of tip 106 is generally flush with the face of die 104.

Additionally, embodiments of the present inventions may use other extrusion processes, for example, a tube-on process without a draw-down vacuum or a pressure extrusion process. However, these other extrusion processes may require different manufacturing settings. For example, the tube-on process without a vacuum does not draw-down buffer layer 14 as quickly and/or tightly so the water trough distance D may need to be increased. Whereas, in the pressure extrusion process, die orifice 105 is generally smaller than the die orifice used for the tubing-on plus draw-down vacuum process.

Figure 6:
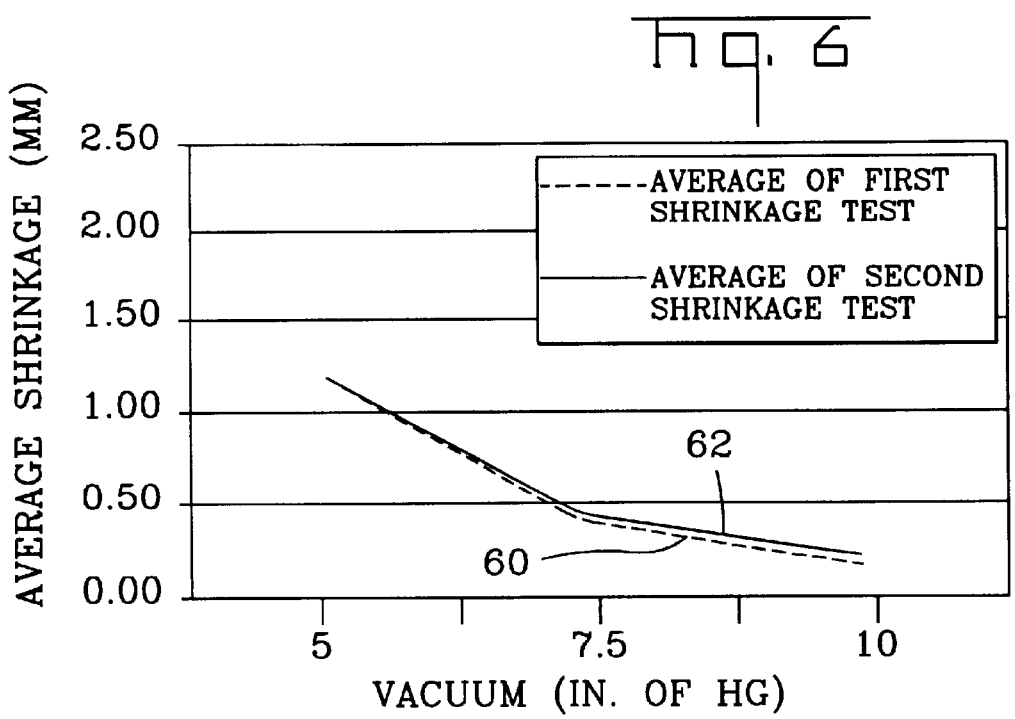
FIG. 6 is an exemplary graph depicting the average shrinkage of a buffer of a buffered optical fiber of FIG. 1 having a buffer material according to the present inventions as a function of processing parameters.

FIG. 6 is an exemplary graph depicting the average shrinkage (mm) as a function of draw-down vacuum (in. of Hg) for an exemplary buffer layer 14 using a material according to the present inventions. More specifically, FIG. 6 depicts the average shrinkage of buffer layer 14 having a nominal outer diameter of about 900 microns made from GFO 9940 DW as a function of draw-down vacuum for the two different shrinkage tests. Additionally, the embodiments relating to the data of FIGS. 6–7a were cooled in a water trough 50 having dual temperature zones, namely, 40° C./23° C., and a water trough distance D of about 50 mm, a linespeed of about 150 meters per minute, and a draw-down ratio of about 3.3. Although not shown in FIG. 6, the inner diameter ID of buffer layer 14 generally decreases as the vacuum applied generally increases.

Lines 60 and 62 (FIG. 6), respectively, represent the average shrinkage of buffer layer 14 for the first and second shrinkage tests. FIG. 6 depicts, all other parameters being equal, that as the draw-down vacuum generally increases the average buffer layer 14 shrinkage generally decreases. As the draw-down vacuum increases, buffer layer 14 is generally drawn down tighter onto optical fiber 12 and helps minimize the shrinkage of buffer layer 14 by coupling the buffer layer 14 to optical fiber 12. Although, a relatively tight buffer layer 14 may make it more difficult to strip buffer layer 14 from optical fiber 12 in long lengths, embodiments of the present inventions had both low shrinkage and good stripability. Additionally, the present inventors believe that there is a limit where increasing the draw-down vacuum does not appreciably decrease the shrinkage of buffer layer 14.

Figure 7A:
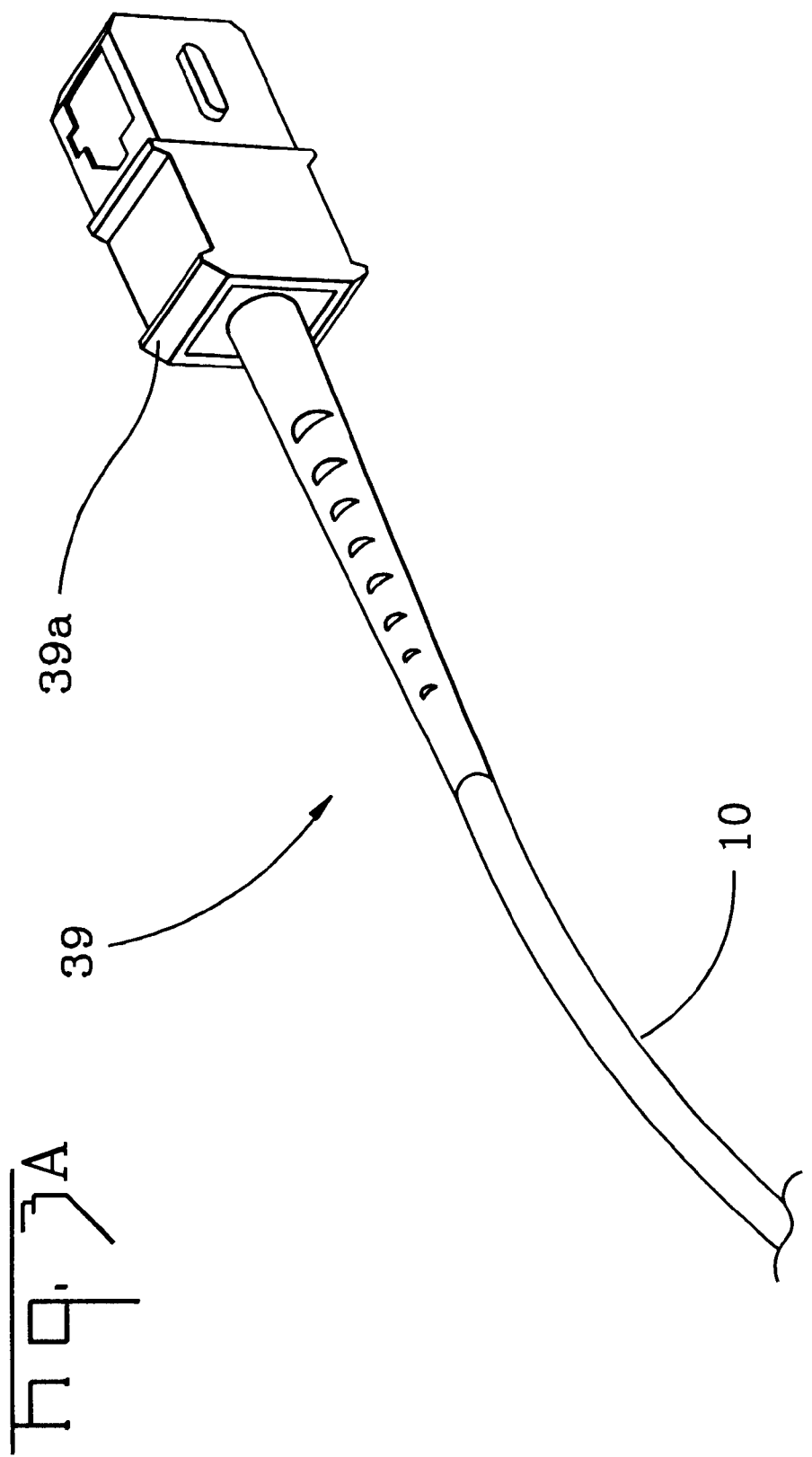
FIG. 7a is an exemplary graph depicting the moisture content of an optical fiber and the buffer layer inner diameter of a buffer material of FIG. 1 according to the present inventions as a function of relative humidity conditioning.
Figure 7:
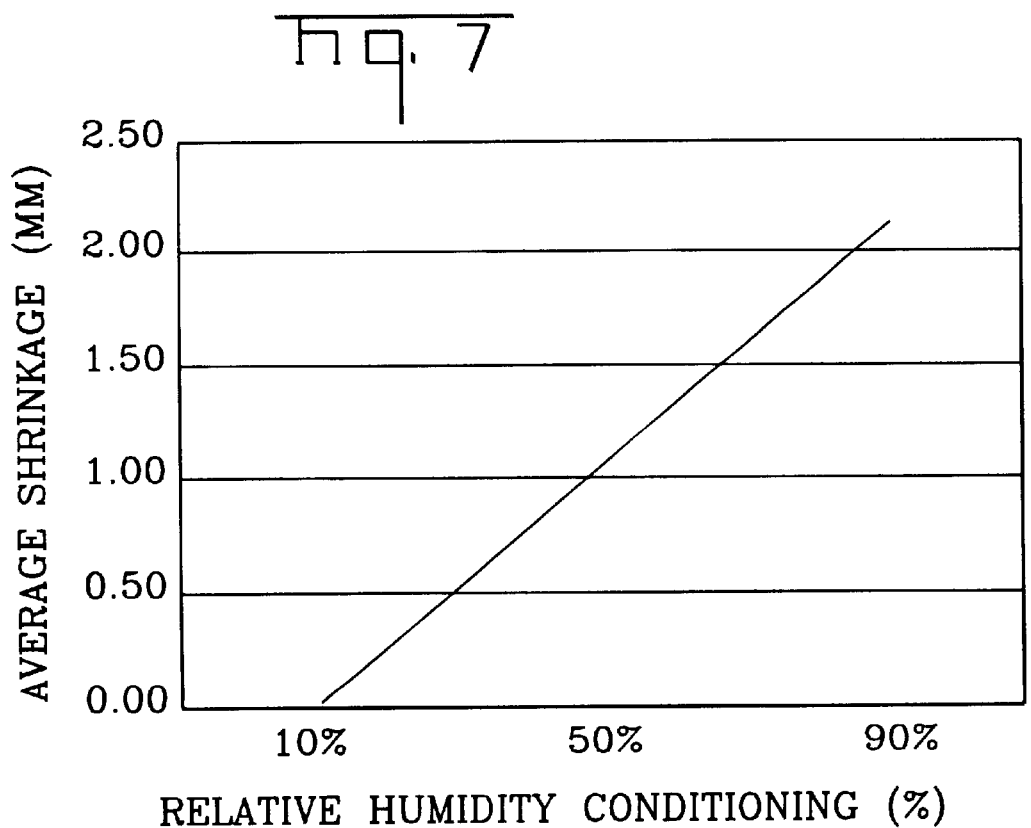
FIG. 7 is an exemplary graph depicting the average shrinkage of a buffer of the buffered optical fiber of FIG. 1 having a buffer material according to the present inventions as a function of relative humidity conditioning.
Figure 7A:
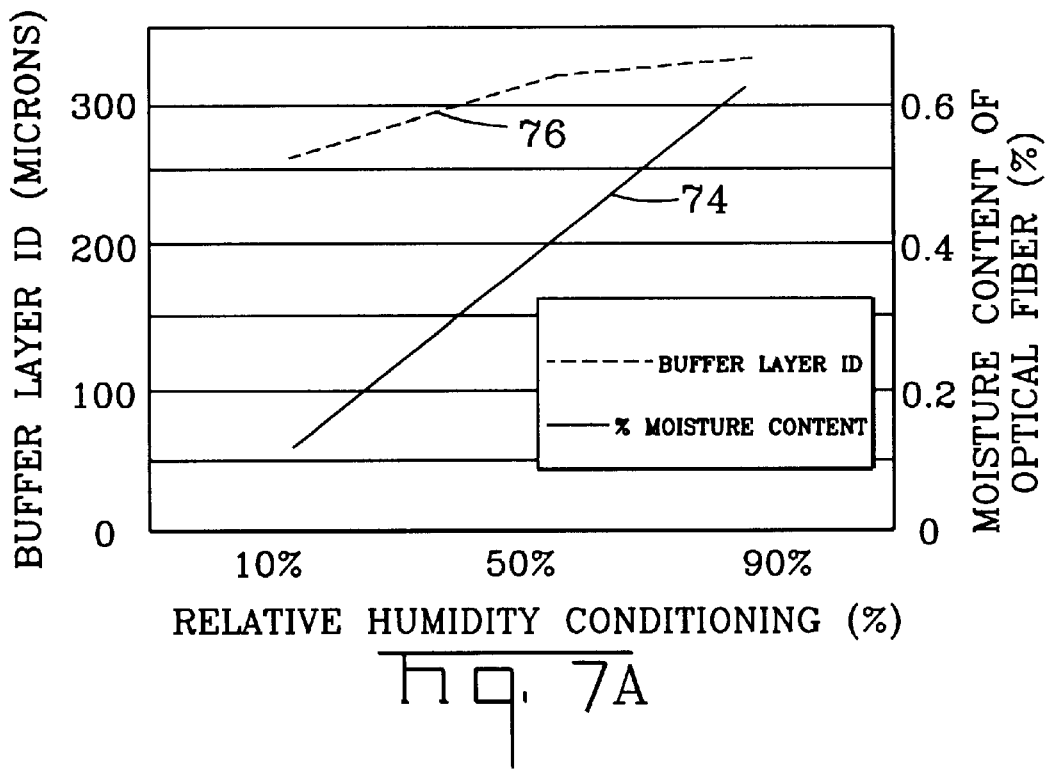

Another parameter that can affect the shrinkage of buffer layer 14 is moisture content of optical fiber 12. FIG. 7 is an exemplary graph depicting the average first test shrinkage of buffer layer 14 as a function of relative humidity conditioning of optical fiber 12 (hereinafter humidity conditioning). More specifically, FIG. 7 depicts the average first test shrinkage of buffer layer 14 made from GFO 9940DW as a function of humidity conditioning. The embodiment of FIG. 7 had a nominal outer diameter of about 900 microns and was manufactured with a draw-down vacuum of about 10 in. of Hg. As shown in FIG. 7a, all other parameters being equal, as the humidity conditioning generally increases, the moisture content of optical fiber 12 also generally increases. Consequently, the shrinkage that buffer layer 14 experiences generally increases. The present inventors believe that increased moisture content of optical fiber 12 results in outgassing during extrusion, thereby resulting in increased buffer inner diameter, which generally increases the shrinkage buffer layer 14 experiences during the shrinkage test as will be discussed herein.

The present inventors investigated this concept by measuring the moisture content of optical fiber 12, based upon a percentage by weight, conditioned at various relative humidities and the corresponding inner diameters ID of buffer layer 14 after manufacture. For this experiment a GFO 9940DW buffer layer having an extrusion temperature profile, from the first zone to the last zone, of about 170° C.–215° C. was run at a draw-down vacuum of 10 in. of Hg with a nominal outer diameter of about 900 microns.

More specifically, line 74 of FIG. 7a depicts an exemplary moisture content of optical fiber 12 as a function of humidity conditioning. Humidity conditioning was accomplished by placing optical fiber 12 in a desiccator having a predetermined relative humidity for a minimum of about 48 hours and then manufacturing buffered optical fiber shortly after removing optical fiber 12 from the desiccator. More specifically, optical fiber 12 was removed from the desiccator and placed directly on an extruder line so that the optical fiber could be buffered before long term exposure to ambient humidity levels. As shown, as the relative humidity within the desiccator generally increased the moisture content of optical fiber 12 also generally increased. Line 76 depicts the inner diameter ID of buffer layer 14 and generally corresponds to the moisture content of optical fiber 12 depicted (line 74). Furthermore, line 76 shows that other parameters being equal as the moisture content of optical fiber 12 generally increased the inner diameter ID of buffer layer 14 generally increased.

For example, when optical fiber 12 had a moisture content of about 0.13% the inner diameter ID of buffer layer 14 was about 260 microns. Whereas, when optical fiber 12 had a moisture content of about 0.6% the inner diameter ID of buffer layer 14 increased to about 330 microns. The present inventors attribute this phenomena to outgassing of the moisture during the extrusion of buffer layer 14. In other words, as the relatively hot buffer material is extruded around optical fiber 12 the moisture content of the fiber turns to vapor and generally increases the inner diameter ID of buffer layer 14. For controlling manufacturing tolerances and/or to reduce shrinkage of buffer layer 14 it may be advantageous to monitor and/or control the moisture content of optical fiber 12. For example, with buffer materials having a relatively high extrusion temperature, above the vapor point of water, it may be advantageous to monitor and/or control the moisture content of optical fiber 12. On the other hand, buffer materials having a relatively lower extrusion temperature may not experience outgassing to the same extent as the GFO 9940DW material or at all.

A number of different methods and/or techniques can be used to control and/or reduce the moisture content of optical fiber 12. For example, pre-heater 44 can be placed on the manufacturing line to dry optical fiber 12 before the extrusion of buffer layer 14. Alternatively, optical fiber 12 can be dried offline and/or stored in a relatively dry environment before manufacture. However, other suitable methods may be used to control and/or reduce the moisture content of optical fiber 12.

Additionally, the present inventors also believe that the water trough distance D can also influence the average buffer layer shrinkage, and more particularly, that as linespeed increases the water trough distance D can have a greater influence on the average buffer layer shrinkage. Water trough distance D is preferably about 50–150 mm, and more preferably about 50–80 mm. However, long water trough distances may affect geometric variances of buffer layer 14, due to, for example, gravity. In general, slower linespeeds and larger water trough distance may be advantageous because these parameters allow more time for the extruded buffer material to achieve a lower-stress state before being quenched in the water trough. In other words, these parameters affect the amount of time the extruded buffer material has to relax into a lower-stress condition before being cooled in the water trough, which generally freezes the stress state of the material. Generally, slower linespeeds mean less production per unit time so it is generally advantageous to run at relatively high linespeeds. However, to some extent faster linespeeds may be compensated by changing water trough distance D, among other parameters, to reduce shrinkage of buffer layer 14 and/or preserve optical performance of buffered optical fiber 10.

Another processing parameter that can influence the shrinkage of buffer layer 14 is draw-down ratio of the extruded material. Draw-down ratio (DDR) is defined by the following equation (FIGS. 5–5B):

$$DDR = \frac{D_2^2 - D_1^2}{d_2^2 - d_1^2}$$

Where:
  $D_2$—Die orifice diameter
  $D_1$—Outer diameter of tip
  $d_2$—Outer diameter of buffer layer
  $d_1$—Inner diameter of buffer layer DDR can be influenced, preferably, by changing the tip and die tooling; however, other suitable methods may be used, for example by moving die 104 relative to tip 106. A relatively low DDR is advantageous because this allows the extruded buffer material to achieve a lower-stress state before being quenched. The DDR is preferably in the range of about 2.0 to about 4.0, more preferably, in the range of about 2.5 to about 3.5, and most preferably about 3.3 or less. However, the processing parameters discussed herein were all tested on the GFO 9940DW material and other suitable materials may be affected differently by the processing parameters.

Furthermore, the concepts of the present inventions may advantageously improve optical performance of buffered optical fiber 10 in other environmental conditions and/or tests other than the temperature cycling test. For example, the concepts of the present inventions may improve optical performance during thermal aging, humidity aging, humidity-condensation cycling, and/or other suitable environmental conditions.

Figure 8:
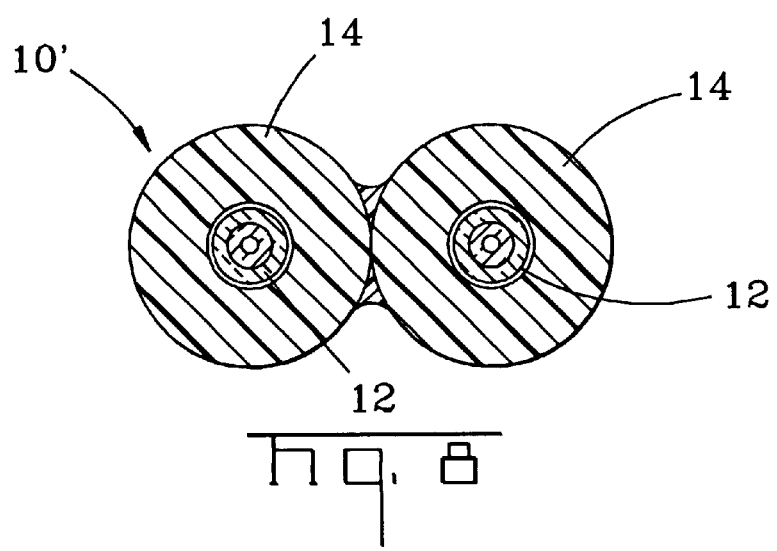
FIG. 8 is a cross-sectional view of an exemplary buffered optical fiber configuration according to another embodiment of the present inventions.

Additionally, the concepts of the present inventions may be advantageously practiced with other suitable buffered optical fiber configurations. For example, FIG. 8 illustrates buffered assembly 10', two buffered optical fibers zipped together in a side by side relationship. Buffered assembly 10' may be configured as disclosed in U.S. patent application Ser. No. 09/749,001 filed on Dec. 27, 2000, which is incorporated herein by reference. However, other suitable buffered optical fiber zipped assembly configurations and/or constructions can be used with the concepts of the present inventions. Likewise, buffered assembly 10' can include suitable connectors to form an interconnect assembly. Moreover, the concepts of the present inventions can be practiced with other suitable components, constructions and/or configurations. For example, the concepts of the present inventions can be used in a fiber optic cable and/or assembly as disclosed in U.S. Pat. No. 5,966,489, which is incorporated herein by reference.

Moreover, the concepts of the present inventions can be advantageously practiced with other suitable optical fiber configurations. For example, FIG. 9 illustrates buffered fiber optic ribbons 10', which can be practiced with the concepts of the present inventions or with conventional buffer materials. More specifically, buffered fiber optic ribbons 10" includes fiber optic ribbons 92 generally surrounded by buffer layer 14; however, one or more fiber optic ribbons 92 having the same and/or other suitable numbers of optical fibers may be used. Buffered fiber optic ribbons 10" provides a relatively high optical fiber density in a generally flat or square configuration. Interfacial layer 15 is not required, but may be included on the outside surface of the optical fiber ribbons 92 and/or therebetween. In one embodiment buffer layer 14 is relatively easy to peel away from fiber optic ribbon(s) 92, this may be accomplished by, for example, notches 94 in buffer layer 14 or other suitable means. In another embodiment, buffer layer 14 could be a UV curable matrix that is relatively easy to peel from fiber optic ribbons 92. As shown in FIG. 9a, buffered fiber optic ribbons 10" further includes one or more cushioning materials 96 that inhibit buffer material 14 from wedging between fiber optic ribbons 92 and/or decouples edge fibers 92a of optical ribbon 92 from buffer layer 14, thereby preserving optical performance.

Cushioning material 96 may cover a portion of optical ribbons 92 or the entire surface of optical ribbons 92. In other embodiments, one or more cushioning materials 92 or regions thereof do not overlap, do not completely surround optical ribbon 92, and/or contact one another. Preferably, cushioning material 96 has a Shore hardness A of about 60 or less to reduce material stiffness and enhance decoupling and cushioning effects. Cushioning material 96 may be formed from, for example, one or more suitable polymers, for example, TPEs, TPUs, thermoplastic rubber (TPRs). In other embodiments, cushioning material is a foamed polymer. Foaming can be accomplished mechanically, chemically, injecting a gas, or by other suitable means. Additionally, other more highly flame retardant polymers can be used as cushioning material 96, foamed or otherwise, such as PVCs or polyvinylidene fluorides (PVDFs). Other suitable flame retardant cushioning materials 96 are, for example, Nomex®, Kapton®, and/or Mica, preferably, being in a soft woven matrix to preserve optical performance. To enhance cushioning and/or improve tensile performance, cushioning material 96 can be a matrix or yarn, such as aramid yarns or polyester that, preferably, has low-shrink characteristics. Stiffer yarns such as fiberglass could be used, but would be less desirable due to optical performance concerns. In other embodiments, cushioning layer 96 can be a material having a three-dimensional network of bonding as disclosed in U.S. patent application Ser. No. 09/322,625, filed on May 28, 1999, which is incorporated herein by reference.

Furthermore, buffered fiber optic ribbons 10″ can be a portion of a fiber optic cable as disclosed in U.S. patent application Ser. No. 09/748,541, filed on Dec. 26, 2000, which is incorporated herein by reference. However, buffered fiber optic ribbon(s) can be used in other suitable cable designs, for example, breakout cable designs. Additionally, buffered fiber optic ribbons 10″ can be an interconnect cable having at least one suitable ribbon connector.

The concepts of the present inventions may also be practiced with other suitable buffering materials, blends thereof, and/or additives. For example, some materials that may be suitable are: thermoplastic polyurethanes (TPUs) such as Estane® 58211 or X-4928 both available from Noveon; GTX-94-350B available from AlphaGary; or WY05352D-1 available from BASF. Other suitable thermoplastic elastomers (TPES) are: thermoplastic vulcanizates (TPVs); flame retardant polyethylenes (FRPEs) such as SGO-302 available from AlphaGary; partially cross-linked chlorinated polyolefins; or polyvinylidene fluorides (PVDFs). However, some grades of certain materials may not be suitable with the concepts of the present inventions.

Furthermore, fiber optic cables may include buffered optical fibers of the present inventions. For example, a buffered optical fiber according to the present inventions can be included in a fiber optic cable as disclosed in U.S. patent application Ser. No. 10/038,073 filed on Jan. 4, 2002, the contents of which are incorporated herein by reference. Additionally, one or more buffered optical fiber according to the present inventions can be included in other suitable fiber optic cables.

In view of the present disclosure, many modifications and other embodiments of the present inventions, within the scope of the appended claims, will become apparent to a skilled artisan. For example, buffered optical fibers of the present inventions may be manufactured from other suitable materials and may be used in fiber optic cables. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The inventions have been described with reference to buffered optical fibers, but the inventive concepts of the present inventions are applicable to other configurations as well.

That which is claimed:

1. A buffered optical fiber comprising:
   at least one optical fiber having a core, a cladding and at least one coating; and
   a buffer layer generally surrounding said optical fiber, wherein said buffer layer has a portion thereof generally contacting a portion of said at least one coating, said buffer layer having an average shrinkage of about 3 mm or less from a first end of said buffered optical fiber, and said buffer layer having an average strip force value of about 5 Newtons or less.

2. The buffered optical fiber according to claim 1, said average shrinkage being measured about one hour after a buffer layer shrinkage test conducted at a temperature of about 150° C. for 5 minutes.

3. The buffered optical fiber according to claim 1, said average shrinkage of said buffer layer being about 1 mm or less.

4. The buffered optical fiber according to claim 1, said average shrinkage being measured about one hour after a buffer layer shrinkage test conducted at a temperature of about 85° C. and 85 percent relative humidity for about two weeks.

5. The buffered optical fiber according to claim 1, said buffered optical fiber being a portion of an interconnect assembly, wherein said interconnect assembly has an average maximum delta insertion loss of about 0.025 dB or less at a reference wavelength of about 1310 nm during a thermal cycling test that cycles the temperature between a minimum of −40° C. and a maximum of 85° C.

6. The buffered optical fiber according to claim 1, said buffered optical fiber being a portion of an interconnect assembly, wherein said interconnect assembly has an average maximum delta insertion loss of about 0.04 dB or less at a reference wavelength of about 1550 nm during a thermal cycling test that cycles the temperature between a minimum of −40° C. and a maximum of 85° C.

7. The buffered optical fiber according to claim 1, said buffered optical fiber being a portion of an interconnect assembly, wherein said interconnect assembly has an average maximum delta insertion loss of about 0.04 dB or less at a reference wavelength of about 1625 nm during a thermal cycling test that cycles the temperature between a minimum of −40° C. and a maximum of 85° C.

8. The buffered optical fiber according to claim 1, said buffer layer being formed from a material having a Shore D hardness, measured using ASTM D-2240, in the range of about 50–60.

9. The buffered optical fiber according to claim 1, said buffer layer being formed from a thermoplastic elastomer (TPE).

10. The buffered optical fiber according to claim 1, said buffer layer being formed from a thermoplastic polyurethane (TPU).

11. The buffered optical fiber according to claim 1, said buffer layer being formed from a polyether type thermoplastic polyurethane (TPU).

12. The buffered optical fiber according to claim 1, said buffer layer being formed from a material having an ultimate ASTM D-412 elongation in the range of about 300 percent or more.

13. The buffered optical fiber according to claim 1, said buffer layer being formed from material having an ultimate ASTM D-412 elongation in the range of about 325 percent or more.

14. The buffered optical fiber according to claim 1, said buffer layer having a generally non-circular cross-section.

15. The buffered optical fiber according to claim 1, said buffer layer being formed from a material having a melting onset temperature being about 90° C. or greater.

16. The buffered optical fiber according to claim 1, said average shrinkage of said buffer layer being about 0.5 mm or less.

17. The buffered optical fiber according to claim 16, said buffered optical fiber having an interfacial layer.

18. The buffered optical fiber according to claim 1, said buffered optical fiber being a portion of an interconnect assembly, wherein said interconnect cable assembly has an average maximum delta insertion loss of about 0.03 dB or less at a reference wavelength selected from the group of about 1310 nm, about 1550 nm and about 1625 nm during a thermal cycling test that cycles the temperature between a minimum of −40° C. and a maximum of 85° C.

19. The buffered optical fiber according to claim 1, said at least one optical fiber having a nominal outer diameter of about 245 microns and said buffer layer having an inner diameter (ID) of about 350 microns or less.

20. The buffered optical fiber according to claim 1, said at least one optical fiber being a portion of at least one optical fiber ribbon.

21. The buffered optical fiber according to claim 20, further comprising at least one cushioning material between said at least one optical fiber ribbon and said buffer layer.

22. A method of manufacturing a buffered optical fiber comprising:

paying off at least one optical fiber; and extruding a buffer layer around said at least one optical fiber, said buffered optical fiber has a portion thereof generally contacting a portion of said at least one coating of said at least one optical fiber, wherein said buffer layer has an average shrinkage of about 3 mm or less from a first end of said buffered optical fiber, and said buffer layer having an average strip force value of about 5 Newtons or less.

23. The method of claim 22, said average shrinkage measured about 1 hour after a buffer layer shrinkage test conducted at a temperature of 150° C. for 5 minutes.

24. The method of claim 22, said average shrinkage being measured about 1 hour after a buffer layer shrinkage test conducted at a temperature of about 85° C. and 85 percent relative humidity for about two weeks.

25. The method of claim 22, said buffered optical fiber being a portion of an interconnect assembly, wherein said interconnect assembly has an average maximum delta insertion loss of about 0.03 dB or less at a reference wavelength selected from the group of about 1310 nm, about 1550 nm and about 1625 nm during a thermal cycling test that cycles the temperature between a minimum of −40° C. and a maximum of 85° C.

26. The method of claim 22, said step of extruding having a draw-down ratio (DDR) in the range of about 2 to about 4.

27. The method of claim 22, the step of extruding a buffer layer further comprising a material having a Shore D hardness, measured using ASTM D-2240, in the range of about 50 to about 60.

28. The method of claim 22, the step of extruding said buffer layer further comprising a material being selected from the group of a thermoplastic elastomer (TPE), a thermoplastic polyurethane (TPU), a partially cross-linked chlorinated polyolefin, a thermoplastic vulcanizates (TPVs), flame retardant polyethylenes (FRPEs), and polyvinylidene fluorides (PVDFs).

29. The method of claim 22, said step of extruding said buffer layer further comprising a material having a melting onset temperature being about 90° C. or greater.

30. The method of claim 22, said step of paying off further comprising an optical fiber having a nominal outer diameter of about 245 microns and said step of extruding a buffer layer further comprising a buffer layer having an inner diameter (ID) of about 350 microns or less.

31. The method of claim 22, said step of paying off further comprising the optical fiber having a moisture content of about 0.6 or less by weight.

32. The method of claim 22, said average shrinkage being about 1 mm or less.

33. A buffered optical fiber comprising:

at least one optical fiber; and a buffer layer generally surrounding said optical fiber, wherein said buffer layer has an average shrinkage of about 0.5 mm or less from a first end of said buffered optical fiber, and said buffer layer having an average strip force value of about 5 Newtons or less.

34. The buffered optical fiber according to claim 33, said average shrinkage being measured about one hour after a buffer layer shrinkage test conducted at a temperature of about 150° C. for 5 minutes.

35. The buffered optical fiber according to claim 33, said average shrinkage being measured about one hour after a buffer layer shrinkage test conducted at a temperature of about 85° C. and 85 percent relative humidity for about two weeks.

36. The buffered optical fiber according to claim 33, said buffer layer being formed from a thermoplastic elastomer (TPE).

37. The buffered optical fiber according to claim 33, said buffer layer being formed from a thermoplastic polyurethane (TPU).

38. The buffered optical fiber according to claim 33, said buffer layer being formed from a polyether type thermoplastic polyurethane (TPU).

39. The buffered optical fiber according to claim 33, said buffer layer having a generally non-circular cross-section.

40. The buffered optical fiber according to claim 33, said buffer layer being formed from a material having a melting onset temperature being about 90° C. or greater.

41. The buffered optical fiber according to claim 33, said buffered optical fiber being a portion of an interconnect assembly, wherein said interconnect cable assembly has an average maximum delta insertion loss of about 0.03 dB or less at a reference wavelength selected from the group of about 1310 nm, about 1550 nm and about 1625 nm during a thermal cycling test that cycles the temperature between a minimum of −40° C. and a maximum of 85° C.

42. The buffered optical fiber according to claim 33, said at least one optical fiber having a nominal outer diameter of about 245 microns and said buffer layer having an inner diameter (ID) of about 350 microns or less.

43. The buffered optical fiber according to claim 33, said at least one optical fiber being a portion of at least one optical fiber ribbon.

44. The buffered optical fiber according to claim 43, further comprising at least one cushioning material between said at least one optical fiber ribbon and said buffer layer.

* * * * *